United States Patent
Zhang et al.

(10) Patent No.: US 8,360,176 B2
(45) Date of Patent: Jan. 29, 2013

(54) BRAZING METHODS FOR PDC CUTTERS

(75) Inventors: Youhe Zhang, Spring, TX (US); Yuelin Shen, Spring, TX (US); Hong Deng, Union City, CA (US)

(73) Assignee: Smith International, Inc., Houston, TX (US)

( * ) Notice: Subject to any disclaimer, the term of this patent is extended or adjusted under 35 U.S.C. 154(b) by 308 days.

(21) Appl. No.: 12/696,706

(22) Filed: Jan. 29, 2010

(65) Prior Publication Data

US 2010/0187020 A1    Jul. 29, 2010

Related U.S. Application Data

(60) Provisional application No. 61/148,279, filed on Jan. 29, 2009.

(51) Int. Cl.
*E21B 10/50* (2006.01)
*E21B 10/62* (2006.01)

(52) U.S. Cl. ......... 175/435; 175/433; 76/108.4; 125/22; 420/504; 228/121

(58) Field of Classification Search .................. 175/428, 175/432–435; 76/108.4; 125/22; 420/504; 228/121
See application file for complete search history.

(56) References Cited

U.S. PATENT DOCUMENTS

| | | | |
|---|---|---|---|
| 4,156,329 A | 5/1979 | Daniels | |
| 4,186,628 A | 2/1980 | Bonnice | |
| 4,199,035 A | 4/1980 | Thompson | |
| 4,200,159 A | 4/1980 | Peschel et al. | |
| 4,729,440 A | 3/1988 | Hall | |
| 4,850,523 A | 7/1989 | Slutz | |
| 4,899,922 A | 2/1990 | Slutz et al. | |
| 5,012,863 A | 5/1991 | Springer | |
| 5,049,164 A | 9/1991 | Horton et al. | |
| 5,333,699 A * | 8/1994 | Thigpen et al. | 175/431 |
| 5,352,542 A * | 10/1994 | Voelcker et al. | 428/673 |
| 5,373,908 A | 12/1994 | Pastusek | |
| 5,429,199 A | 7/1995 | Sheirer et al. | |
| 5,487,436 A | 1/1996 | Griffin | |
| 5,533,582 A | 7/1996 | Tibbitts | |
| 5,560,440 A | 10/1996 | Tibbitts | |

(Continued)

FOREIGN PATENT DOCUMENTS

| CA | 2567011 | 5/2007 |
|---|---|---|
| CA | 2646370 | 7/2009 |

(Continued)

OTHER PUBLICATIONS

International Search Report and Written Opinion of the International Searching Authority mailed Jun. 18, 2010 for corresponding application No. PCT/US2010/022565 filed Jan. 29, 2010.

*Primary Examiner* — Jennifer H Gay

(57) ABSTRACT

A method for a down hole cutting tool is disclosed, wherein the cutting tool includes a cutting element support structure having at least one cutter pocket to support a cutting element comprising a substrate and an ultrahard layer. The method includes inserting a base portion of the cutting element into the cutter pocket; locating a first braze alloy such that when heated the first braze alloy melts and fills a space in the cutter pocket between the cutting element and the cutting element support structure adjacent the ultrahard layer; locating a second braze alloy such that when heated the second braze alloy melts and fills a space in the cutter pocket between the cutting element and the cutting element support structure non-adjacent the ultrahard layer; and heating the first and second braze alloy such that they melt.

30 Claims, 4 Drawing Sheets

U.S. PATENT DOCUMENTS

| | | | |
|---|---|---|---|
| 5,737,980 A * | 4/1998 | Keith et al. | 76/108.2 |
| 5,967,249 A | 10/1999 | Butcher | |
| 6,054,693 A | 4/2000 | Barmatz et al. | |
| 6,213,380 B1 | 4/2001 | Collins et al. | |
| 6,541,124 B1 | 4/2003 | Suggs | |
| 6,742,611 B1 | 6/2004 | Illerhaus et al. | |
| 7,267,187 B2 * | 9/2007 | Kembaiyan | 175/434 |
| 7,320,505 B1 | 1/2008 | Hall et al. | |
| 7,347,292 B1 | 3/2008 | Hall et al. | |
| 7,389,834 B1 | 6/2008 | Kembaiyan | |
| 7,487,849 B2 | 2/2009 | Radtke | |
| 7,597,159 B2 * | 10/2009 | Overstreet | 175/374 |
| 7,625,521 B2 * | 12/2009 | Izaguirre et al. | 419/10 |
| 7,703,555 B2 * | 4/2010 | Overstreet | 175/425 |
| 7,757,793 B2 | 7/2010 | Voronin | |
| 7,909,121 B2 * | 3/2011 | Voronin et al. | 175/435 |
| 7,997,358 B2 * | 8/2011 | Izaguirre et al. | 175/374 |
| 7,997,359 B2 * | 8/2011 | Eason et al. | 175/425 |
| 8,002,052 B2 * | 8/2011 | Stevens et al. | 175/374 |
| 8,061,454 B2 | 11/2011 | Voronin et al. | |
| 2003/0079916 A1 | 5/2003 | Oldham | |
| 2003/0084894 A1 | 5/2003 | Sung | |
| 2004/0244540 A1 | 12/2004 | Oldham et al. | |
| 2004/0245022 A1 | 12/2004 | Izaguirre et al. | |
| 2005/0087371 A1 | 4/2005 | Kembaiyan | |
| 2005/0089440 A1 | 4/2005 | Kembaiyan | |
| 2005/0103533 A1 | 5/2005 | Sherwood, Jr. et al. | |
| 2005/0230156 A1 | 10/2005 | Belnap et al. | |
| 2005/0263328 A1 | 12/2005 | Middlemiss | |
| 2006/0191723 A1 | 8/2006 | Keshavan | |
| 2006/0254830 A1 | 11/2006 | Radtke | |
| 2007/0023206 A1 | 2/2007 | Keshavan et al. | |
| 2007/0056776 A1 | 3/2007 | Overstreet | |
| 2007/0079994 A1 | 4/2007 | Middlemiss | |
| 2007/0102199 A1 | 5/2007 | Smith et al. | |
| 2007/0131459 A1 | 6/2007 | Voronin et al. | |
| 2007/0205023 A1 | 9/2007 | Hoffmaster | |
| 2007/0278017 A1 | 12/2007 | Shen et al. | |
| 2008/0029310 A1 | 2/2008 | Stevens et al. | |
| 2008/0128176 A1 | 6/2008 | Choe | |
| 2008/0164070 A1 | 7/2008 | Keshavan | |
| 2008/0230279 A1 | 9/2008 | Bitler | |
| 2009/0102588 A1 | 4/2009 | Sigler | |
| 2009/0173014 A1 | 7/2009 | Voronin et al. | |
| 2009/0173547 A1 | 7/2009 | Voronin et al. | |
| 2009/0173548 A1 | 7/2009 | Voronin et al. | |
| 2010/0187020 A1 * | 7/2010 | Zhang et al. | 175/428 |
| 2010/0264198 A1 | 10/2010 | Voronin et al. | |
| 2010/0314176 A1 * | 12/2010 | Zhang et al. | 175/383 |
| 2011/0024200 A1 | 2/2011 | DiGiovanni et al. | |
| 2011/0031031 A1 | 2/2011 | Vempati et al. | |
| 2011/0127088 A1 * | 6/2011 | Voronin et al. | 175/428 |

FOREIGN PATENT DOCUMENTS

| | | |
|---|---|---|
| CA | 2646374 | 7/2009 |
| CA | 2646752 | 7/2009 |
| EP | 0295151 A2 | 12/1988 |
| FR | 2774420 A1 | 8/1999 |
| GB | 2337063 A | 11/1999 |
| GB | 2351987 A | 1/2001 |
| GB | 2422394 A | 7/2006 |
| GB | 2427215 A | 12/2006 |
| GB | 2431948 | 5/2007 |
| GB | 2431948 A | 9/2007 |
| GB | 2456224 | 7/2009 |
| GB | 2456380 | 7/2009 |
| GB | 2458196 | 8/2009 |
| GB | 2471413 A | 12/2010 |
| GB | 2471412 | 2/2011 |
| JP | 2000000686 A2 | 1/2000 |
| SU | 1803518 A1 | 3/1993 |
| WO | 98/45091 | 4/1997 |
| WO | 9929465 | 6/1999 |
| WO | 2010088504 | 8/2010 |

* cited by examiner

BRAZING METHODS FOR PDC CUTTERS

CROSS-REFERENCE TO RELATED APPLICATIONS

This application claims priority to U.S. Provisional Application No. 61/148,279, filed Jan. 29, 2009, which is incorporated herein by reference in its entirety.

BACKGROUND OF INVENTION

1. Field of the Invention

Embodiments disclosed herein relate generally to polycrystalline diamond cutting elements. More particularly, embodiments of the present disclosure relate to brazing of polycrystalline diamond cutting elements to a drill bit or other downhole cutting tool.

2. Background Art

Polycrystalline diamond compact ("PDC") cutters have been used in industrial applications including rock drilling and metal machining for many years. In a typical application, a compact of polycrystalline diamond (PCD) (or other superhard material) is bonded to a substrate material, which is typically a sintered metal-carbide to form a cutting structure. PCD comprises a polycrystalline mass of diamonds (typically synthetic) that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

A PDC cutter may be formed by placing a cemented carbide substrate into the container of a press. A mixture of diamond grains or diamond grains and catalyst binder is placed atop the substrate and treated under high pressure, high temperature conditions. In doing so, metal binder (often cobalt) migrates from the substrate and passes through the diamond grains to promote intergrowth between the diamond grains. As a result, the diamond grains become bonded to each other to form the diamond layer, and the diamond layer is in turn bonded to the substrate. The substrate often comprises a metal-carbide composite material, such as tungsten carbide. The deposited diamond layer is often referred to as the "diamond table" or "abrasive layer."

A significant factor in determining the longevity of PDC cutters is the exposure of the cutter to heat. Exposure to heat can cause thermal damage to the diamond table and eventually result in the formation of cracks (due to differences in thermal expansion coefficients) which lead to spalling of the polycrystalline diamond layer, delamination between the polycrystalline diamond and substrate, and back conversion of the diamond to graphite causing rapid abrasive wear. The thermal operating range of conventional PDC cutters is typically 700-750° C. or less.

As mentioned, conventional polycrystalline diamond is stable at temperatures of up to 700-750° C. in air, after which observed increases in temperature may result in permanent damage to and structural failure of polycrystalline diamond. This deterioration in polycrystalline diamond is due to the significant difference in the coefficient of thermal expansion of the binder material, cobalt, as compared to diamond. Upon heating of polycrystalline diamond, the cobalt and the diamond lattice will expand at different rates, which may cause cracks to form in the diamond lattice structure and result in deterioration of the polycrystalline diamond. Damage may also be due to graphite formation at diamond-diamond necks leading to loss of microstructural integrity and strength loss, at extremely high temperatures.

Cutters are conventionally attached to a drill bit by a brazing process. In the brazing process, a braze material is positioned between the cutter and the cutter pocket. The material is melted and, upon subsequent solidification, bonds the cutter in the cutter pocket. Selection of braze materials depends on their respective melting temperatures, as higher braze temperatures cannot be used without resulting in damage to the diamond layer prior to the bit (and cutter) even being used in a drilling operation.

This temperature restriction greatly limits the number of alloys that can be used as braze alloy for cutting elements with diamond layers thereon because most brazing alloys that provide sufficient shear strength for bonding cutting elements to a drill bit also require brazing at temperatures above 700° C. Therefore, alloys suitable for brazing cutting elements with diamond layers thereon have been limited to only a couple of alloys which offer low enough brazing temperatures to avoid damage to the diamond layer and high enough braze strength to retain cutting elements on drill bits. Further, in most manual brazing processes, it is difficult to control the brazing temperature.

Accordingly, there exists a continuing need for developments in brazing methods to prevent thermal damage to PDC cutters during installation in a drill bit.

SUMMARY OF INVENTION

In one aspect, embodiments disclosed herein relate to a method for manufacturing a down hole cutting tool, wherein the cutting tool includes a cutting element support structure having at least one cutter pocket formed therein to support a cutting element comprising a substrate and an ultrahard layer, wherein the method includes inserting a base portion of the cutting element into the cutter pocket; locating a first braze alloy such that when heated the first braze alloy melts and fills a space in the cutter pocket between the cutting element and the cutting element support structure adjacent the ultrahard layer; locating a second braze alloy such that when heated the second braze alloy melts and fills a space in the cutter pocket between the cutting element and the cutting element support structure non-adjacent the ultrahard layer; and heating the first and second braze alloy such that they melt, wherein the first braze alloy differs from the second braze alloy.

In another aspect, embodiments disclosed herein relate to a downhole cutting tool that includes a cutting element support structure having at least one cutter pocket formed therein; at least one cutting element secured in the at least one cutter pocket, the cutting element comprising a substrate and an ultrahard layer disposed on the substrate; and at least two braze materials securing the at least one cutting element in the at least one cutter pocket, the at least two braze materials having a difference in braze temperature, wherein a first braze material is adjacent the ultrahard layer, and a second braze material is non-adjacent the ultrahard layer.

In yet another aspect, embodiments disclosed herein relate to a fixed cutter drill bit that includes a bit body; at least one blade extending radially from a center of the bit body; at least one cutter pocket formed in the at least one blade; at least one cutting element secured in the at least one cutter pocket, the cutting element comprising a substrate and an ultrahard layer disposed on the substrate; and at least two braze materials securing the at least one cutting element in the at least one cutter pocket, wherein a first braze material is adjacent the ultrahard layer and has a braze temperature less than 700° C.

and the second braze material has a braze temperature greater than 700° C. and is rearwardly located from the ultrahard layer.

Other aspects and advantages of the invention will be apparent from the following description and the appended claims.

DETAILED DESCRIPTION

Embodiments disclosed herein relate to downhole cutting tools and methods for manufacturing downhole cutting tools, specifically, brazing methods used in brazing cutting elements to a downhole cutting tool. In particular, embodiments disclosed herein relate to use of multiple braze materials in brazing cutting elements containing ultrahard materials to a downhole cutting tool. Use of multiple braze materials may allow for use of a lower melting point braze material adjacent the ultrahard material coupled with a higher melting point braze material a selected distance from the ultrahard material.

Figure 1:
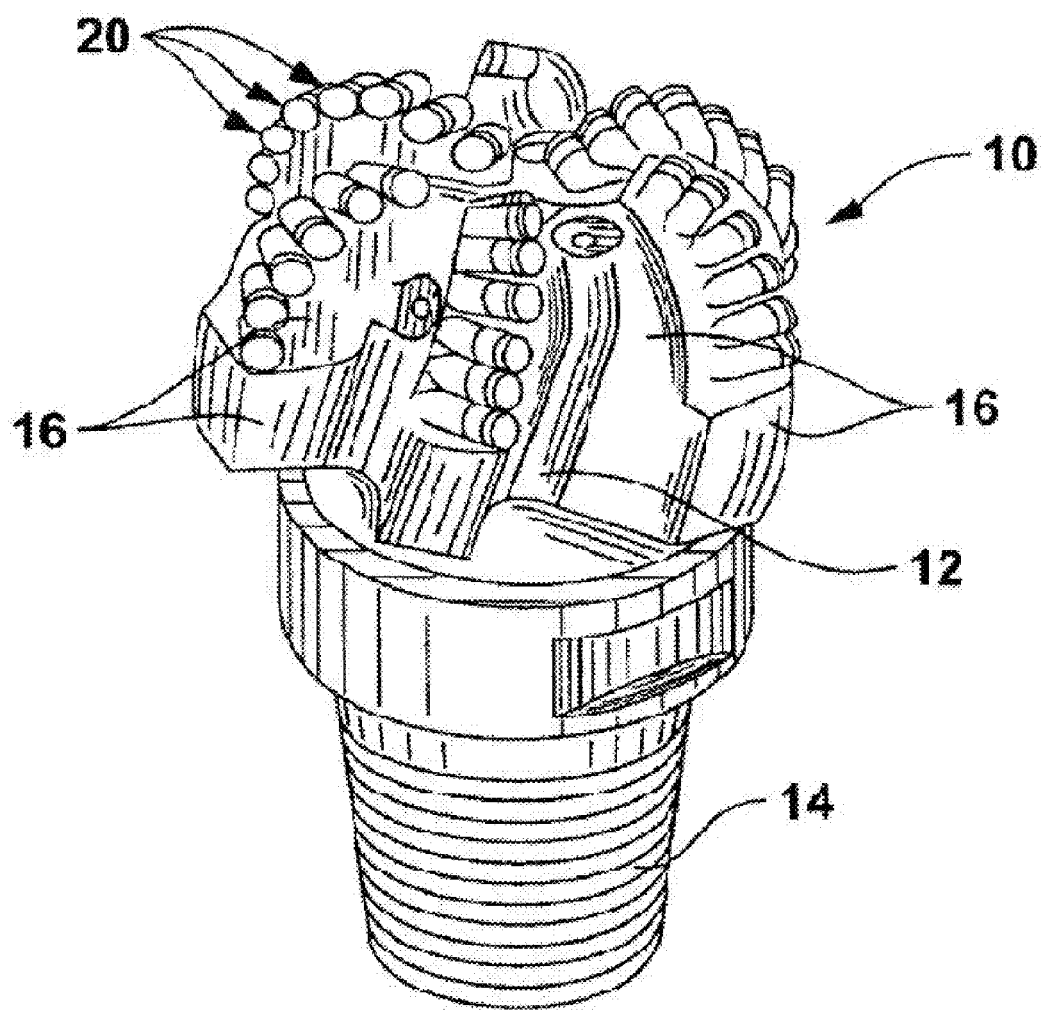
FIG. 1 shows a fixed cutter drill bit.

Referring to FIG. 1, a drill bit 10, specifically a fixed cutter drill bit, is shown. The drill bit 10 includes a bit body 12, which may be formed of a matrix material, such as a tungsten carbide powder infiltrated with an alloy binder material, or may be a machined steel body. The bit body 12 includes a threaded connection 14 at one end for coupling the bit 10 to a drilling string assembly (not shown). The bit body 12 also includes a cutting element support structure which, in this example, comprises a plurality of blades 16 extending radially from the center of the bit. Each of the blades 16 includes a plurality of cutter pockets (or cavities) (26 in FIGS. 3 and 4) formed therein along the periphery to accept and support a base of a cutting element 20 therein.

Figure 2:
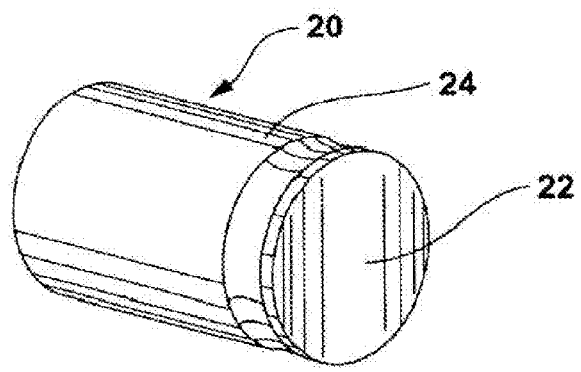
FIG. 2 shows a PDC cutter.

The cutting elements 20 may include polycrystalline diamond or diamond like compact cutters, which may also be referred to as "PDC cutters" or "cutters" 20. A perspective view of a cutter 20 is shown, for example, in FIG. 2. In general, polycrystalline diamond or diamond like compacts have been used in industrial applications including rock drilling and metal machining for many years. Referring to FIG. 2, typically, in these applications, a compact of ultrahard material 22, such as polycrystalline diamond ("PCD") or polycrystalline cubic boron nitride ("PCBN"), is bonded to a substrate material 24 to form a cutter 20. The substrate material is typically a sintered metal-carbide, such as a tungsten carbide sintered with a cobalt binder. The ultrahard material 22 bonded to the substrate 24 is sometimes referred to as a diamond table. The substrate 24 and ultrahard material 22 together form the PDC cutter 20. Methods for making diamond and composite compacts are described, for example in U.S. Pat. Nos. 3,745,623; 3,609,818; 3,850,591; 4,394,170; 4,403,015; 4,525,178; and 4,647,546; and 4,954,139.

Figure 3:
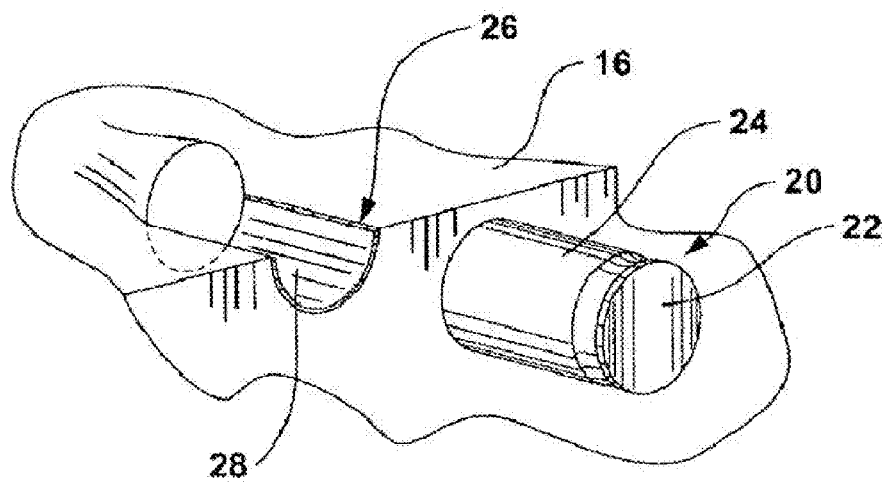
FIG. 3 illustrates a cutter being placed into a cutter pocket.

As shown in FIG. 3, cutters 20 are typically secured in cutter pockets 26 by brazing, whereby heat and a braze alloy 28 are used to join cutters 20 to the bit 10 in its cutter pockets 26. Brazing is a metal joining process that occurs at temperatures between those for soldering (occurring at temperatures below 840° F. (450° C.)) and welding (typically above 1830° F. (1000° C.). In brazing, braze materials (generally defined as alloys having a melting temperature above 840° F. (450° C.), but less than the components to be joined) are heated above their melting point, and once in molten form, are distributed between the two components to be joined by capillary action. The components are joined when the molten braze material cools and hardens. As the base components to be joined are not melted by brazing, they typically retain most of their physical properties and the danger of metal distortion or warping, associated with welding, is minimized. Also, unlike soldering, brazing provides a strong metallic bond between the braze alloy and components being joined. The melting range for a brazing alloy is defined by the minimum temperature at which the alloy will start to melt ("solidus") and the temperature at which the alloy is 100% liquid ("liquidus"). For most purposes, the actual brazing temperature is 50° F. to 200° F. (30° C. to 110° C.) above the liquidus temperature. Thus, reference to specific temperatures may refer to the braze temperature, and not just a melting temperature, in particular, as it is the braze temperature which is necessary to form a braze. However, reference to melting temperatures may generally refer to whether a material melts at, and thus requires, a higher or lower applied temperature (braze temperature).

Figure 4:
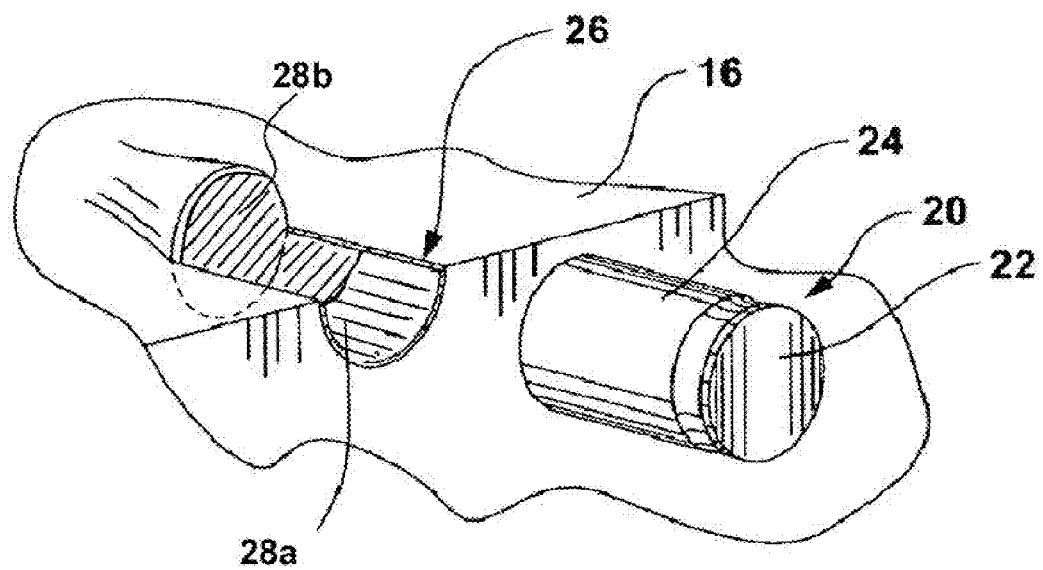
FIG. 4 illustrates a cutter being placed into a cutter pocket according to one embodiment of the present disclosure.
Figure 5:
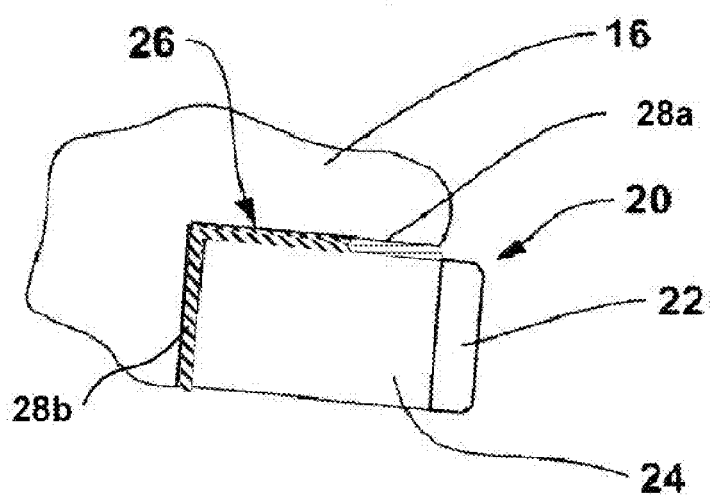
FIG. 5 shows a cross-sectional view of the cutter of FIG. 4 placed in the cutter pocket according to one embodiment of the present disclosure.
Figure 6:
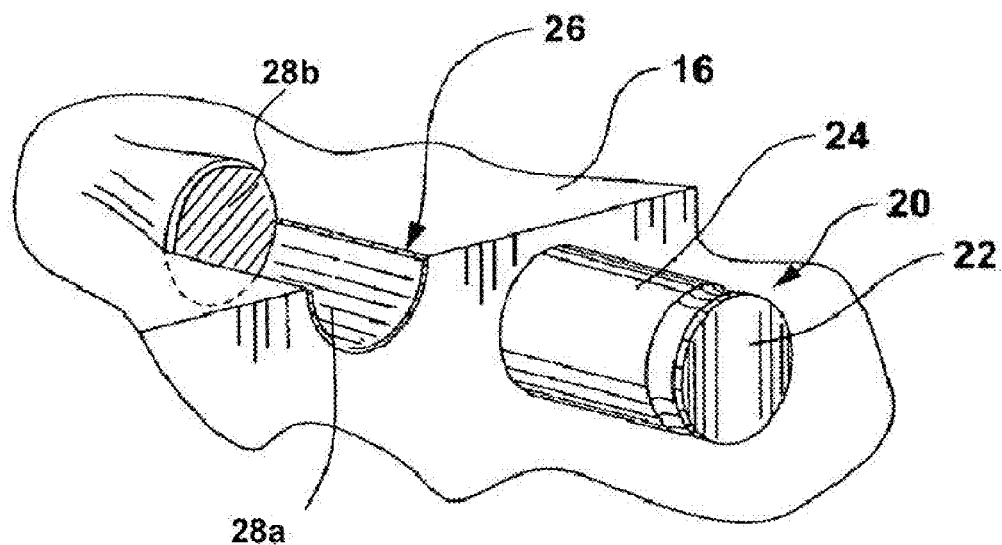
FIG. 6 illustrates a cutter being placed into a cutter pocket according to one embodiment of the present disclosure.

Referring to FIGS. 4 and 5, an illustration and a partial cross-sectional view of a cutter 20 brazed in a cutter pocket 26 in accordance with embodiments of the present disclosure are shown. As illustrated in FIGS. 4 and 5, a base portion of the cutter 20 is inserted in the cutter pocket 26 of the blade 16 and fixed therein by brazing. In the embodiment shown, cutter 20 is brazed into cutter pocket 26 with two braze alloys 28a and 28b, whereas cutters 20 are conventionally brazed into cutter pockets 26 using only a single braze alloy type (as shown in FIG. 3). In the embodiments shown in FIGS. 4 and 6, braze alloys 28a and 28b are disposed in the space between cutter pocket 26 and cutter 20 to jointly secure cutter 20 in place. Braze alloys 28a and 28b differ in constitution (composition) and may be selected based on their melting temperatures (and respective braze strengths).

In particular, conventionally, a single braze alloy having a melting temperature less than about 700° C. (to prevent unnecessary thermal exposure and/or damage to the ultrahard material) is used in securing cutters in cutter pockets. However, in accordance with embodiments of the present disclosure, multiple braze alloys having differing alloying constituents, as well as differing melting temperatures may be used to secure the cutters in place.

In one embodiment, a conventional brazing alloy 28a may be selected for use in the space between cutter pocket 26 and cutter 20 adjacent the ultrahard layer 22 on the cutter 20 (once in place in the cutter pocket 26) while a high temperature brazing alloy 28b may be used in the space between cutter pocket 26 and cutter 20 non-adjacent or rearwardly located from the ultrahard layer 22, as illustrated in FIGS. 4 and 5. The high temperature brazing alloy may be located a selected distance from the ultrahard layer, which in one particular embodiment, is at least half the length of the substrate. In other embodiments, the high temperature brazing alloy may be placed along the cutter pocket rear surface (corresponding to the cutter bottom surface) and flow into at least a portion of the cutter pocket side surface (corresponding to the cutter side surface) or the high temperature brazing alloy may be placed along the rear surface and a portion of the side surface corresponding to no more than half the length of the cutter substrate. As used herein, the term "conventional brazing" refers to brazing accomplished with low to moderate temperatures that are not high enough (i.e., less than 700° C.) to damage the ultrahard layer (e.g., polycrystalline diamond) of the cutter. The term "high temperature brazing" refers to brazing accomplished with a temperature which is high enough to damage the ultrahard layer (700° C. or above) of the cutter if such temperatures were experienced by the ultrahard layer. Such high temperature brazing alloys can produce bonds having even higher shear strength than conventional brazing alloys.

Figure 7:
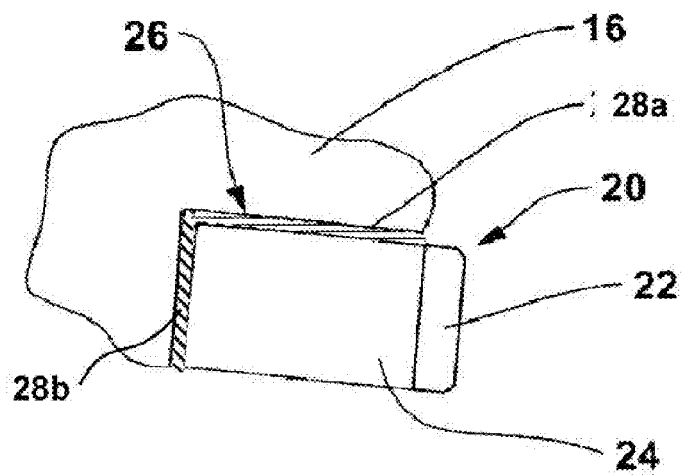
FIG. 7 shows a cross-sectional view of the cutter of FIG. 6 placed in the cutter pocket according to one embodiment of the present disclosure.

Brazing of cutter 20 in cutter pocket 26 with braze alloys 28a and 28b may be accomplished in the following manner. Cutter 20 may be oriented to present ultrahard layer 22 at an appropriate angle so that a curved edge thereof is presented to an earth formation during drilling. After the cutters 20 are set into the pockets 26 with suitable brazing alloys 28a and 28b, each cutter 20 is heated, typically with a torch, to produce a bond between the cutter 20 and the bit body 10. Placement of braze alloys 28a and 28b may be achieved using braze foils or discs and/or braze rods, as known in the art of brazing. For example, one or more braze discs or foils may be placed along the rear and/or side surfaces of the pocket (prior to placement of the cutter) to be melted into place during a subsequent heating. Additionally (and/or alternatively) one or more brazing rods may be used by locating the brazing rod proximal to the space between the cutter pocket and cutter (after placement of the cutter), which may be melted into place during with the application of heat. In a particular embodiment, shown in FIGS. 6 and 7, a high melting temperature brazing alloy disc 28b may be placed in the space between the rear surface of cutter pocket 26 and cutter 20 to bond the rear surface of cutter pocket 26 to the corresponding rear surface of substrate 24 (of cutter 20). A conventional brazing alloy rod containing braze alloy 28a may be used to braze the corresponding side surfaces of cutter 20 and cutter pocket 26. Application of heat (to effectuate the braze or bond between cutter 20 and cutter pocket 26) may be more directly applied to the rear end of cutter 20 so that the applied temperatures (sufficient to melt high temperature braze alloy, i.e., greater than 700° C.) are not experienced (to the same temperature level) at the front of the cutter 20 at ultrahard layer 22. Depending on the temperatures experienced along the side surface of cutter 20 (and whether sufficient to melt braze alloy 28a), it may be necessary to also apply a lower temperature heat (less than 700° C.) to melt braze alloy 28a. Additionally, it may also be desirable to heat braze alloy 28b in the absence of braze alloy 28a, and then locate a braze alloy 28a (such as in the form of a braze rod) proximal the space between the cutter pocket 26 and side surface of cutter 20 to be heated and melted into place in the space between the cutter pocket 26 and side surface of cutter 20 (including adjacent ultrahard layer 22).

Metal alloys typically used as braze alloys include, for example, copper, nickel, silver, or gold based alloys. More specifically, base metals may be selected from silver, copper, gold, and nickel, while alloys may also include as other constituents at least one of tin, zinc, titanium, zirconium, nickel, manganese, tellurium, selenium, antimony, bismuth, gallium, cadmium, iron, silicon, phosphorous, sulfur, platinum, palladium, lead, magnesium, germanium, carbon, oxygen, as well as other elements. Generally, gold-, nickel-, and copper-based alloys may used as high temperature braze materials, whereas silver-based alloys typically may have braze temperatures of less than or more than 700° C. In a particular embodiment, both braze alloys 28a and 28b may be silver-based braze alloys having different alloy constituents and as a result, melting temperatures. For example, in a particular embodiment, a Ag—Cu—Zn—Sn—Ga alloy (such as BrazeTec 5662 from Umicore BrazeTec (Glens Falls, N.Y.)) may be used as the low temperature braze alloy (adjacent the ultrahard layer) while a Ag—Cu—Zn—Ni—Mn alloy (such as BAg-22 available from Silvaloy (Warwick, R.I.) under A49Mn) or a Ag—Cu—Zn—Ni alloy (such as BAg-24 available from Silvaloy (Warwick, R.I.) under A50N) may be used as the high temperature braze alloy.

While the embodiments described above indicate or illustrate a clear demarcation between braze alloys 28a and 28b, one skilled in the art would appreciate that depending on the way in which the braze alloys are melted, there may be some commingling of molten alloys to form a new alloy(s) when cooled.

Further, while the above embodiment describes use of a braze material having a braze temperature of less than 700° C. adjacent the ultrahard layer, the specific reference to 700° C. refers to an embodiment in which the ultrahard layer is polycrystalline diamond, specifically. However, it is within the scope of the present disclosure that cutters with other types of ultrahard layers, such as, thermally stable polycrystalline diamond (formed by removing Group VIII metals from the interstitial regions or using Si/SiC as a catalyzing material) or PCBN may be used in accordance with the embodiments disclosed herein. Depending on the type of material (and the thermal limits of the material), the acceptable braze temperatures for the braze material selected to be adjacent the ultrahard material may vary. Thus, reference to 700° C. as being the dividing line between low and high melting temperature brazes is illustrative of embodiments using a PCD ultrahard layer.

Additionally, while FIGS. 4-7 show the use of two braze materials to braze a cutter in place, the present disclosure also equally applies to use of three or more braze materials, etc. Further, while the present disclosure may specifically discuss brazing methods used to attach PDC cutters to a fixed cutter drill bit, it is also within the scope of the present invention that the brazing methods disclosed herein be applied to any cutting elements (particularly those including an ultrahard material) used on other types of drilling tools, such as roller cone drill bits, reaming tools, fishing tools, stabilizer blades, milling tools, and hole openers. Thus, the present disclosure equally applies to brazing of cutting elements to any cutting element support structure of any downhole cutting tool.

Embodiments of the present disclosure advantageously provide for at least one of the following. Typically, a single braze alloy is used to secure a cutter to a drill bit blade (specifically, cutter pocket formed in blades), and such material is selected largely based on braze temperatures and expected exposure of the ultrahard layer to excessively high temperatures. However, by using multiple braze materials, alloys with differing braze temperatures may be used depending on relative proximity to an ultrahard layer so that a high braze temperature alloy (which also often has a higher shear strength) may be used without exposing the ultrahard layer to excessive temperatures.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for a down hole cutting tool, the cutting tool including a cutting element support structure having at least one cavity formed therein to support a cutting element comprising a substrate and an ultrahard layer, the method comprising:
   inserting a base portion of the cutting element into the cavity;
   locating a first braze alloy such that when heated the first braze alloy melts and fills a space in the cavity between the cutting element and the cutting element support structure adjacent the ultrahard layer;
   locating a second braze alloy such that when heated the second braze alloy melts and fills a space in the cavity between the cutting element and the cutting element support structure non-adjacent the ultrahard layer;
   wherein the braze temperature of the second braze alloy is greater than the braze temperature of the first braze alloy; and heating the first and second braze alloy such that they melt.

2. The method of claim 1, wherein the locating the first braze alloy comprises placing the first braze alloy in the cavity prior to the inserting of the cutting element.

3. The method of claim 1, wherein the locating the second braze alloy comprises placing the second braze alloy in the cavity prior to the inserting of the cutting element.

4. The method of claim 1, wherein the locating the first braze alloy comprises placing the first braze alloy proximal the space between the cutting element and the cutting element support structure.

5. The method of claim 1, further comprising cooling the first and second braze alloys such that they bond the cutting element to the cutting element support structure.

6. The method of claim 1, wherein the first braze alloy has a braze temperature of less than 700° C.

7. The method of claim 1, wherein the second braze alloy has a braze temperature of at least 700° C.

8. The method of claim 1, wherein the first braze alloy is a silver-based alloy.

9. The method of claim 1, wherein the second braze alloy is a silver-based alloy.

10. The method of claim 1, wherein the heating is a two-step heating process comprising heating the second braze alloy and then heating the first braze alloy.

11. The method of claim 1, wherein the heating is a one-step heating process comprising directly heating the second braze alloy to indirectly heat the first braze alloy.

12. The method of claim 1, wherein the tool comprises a tool body and the cutting element support structure comprises a blade that extends radially from the tool body.

13. The method of claim 1, wherein the down hole cutting tool comprises a drill bit.

14. The method of claim 13, wherein the drill bit comprises a fixed cutter bit.

15. The method of claim 14, wherein the fixed cutter drill bit further comprises a bit body and the cutting element support structure comprises a blade formed continuous with the bit body.

16. The method of claim 1, wherein the ultrahard layer comprises polycrystalline diamond.

17. A downhole cutting tool, comprising:
   a cutting element support structure having at least one cutter pocket formed therein;
   at least one cutting element secured in the at least one cutter pocket, the cutting element comprising a substrate and an ultrahard layer disposed on the substrate; and
   at least two braze materials securing the at least one cutting element in the at least one cutter pocket, wherein one a first braze material is adjacent the ultrahard layer, and a second braze material is non-adjacent the ultrahard layer and has a greater braze temperature than the first braze material.

18. The tool of claim 17, wherein the first braze alloy has a braze temperature of less than 700° C.

19. The tool of claim 17, wherein the second braze alloy has a braze temperature of greater than 700° C.

20. The tool of claim 17, wherein the first braze alloy is a silver-based alloy.

21. The tool of claim 17, wherein the second braze alloys is a silver-based alloy.

22. The tool of claim 17, wherein the tool comprises a tool body and the cutting element support structure comprises a blade that extends radially from the tool body.

23. The tool of claim 17, wherein the down hole cutting tool comprises a drill bit.

24. The tool of claim 23, wherein the drill bit comprises a fixed cutter bit.

25. The tool of claim 24, wherein the fixed cutter drill bit further comprises a bit body and the cutting element support structure comprises a blade formed continuous with the bit body.

26. The tool of claim 17, wherein the ultrahard layer comprises polycrystalline diamond.

27. A fixed cutter drill bit, comprising:
   a bit body;
   at least one blade extending radially from a center of the bit body;
   at least one cutter pocket formed in the at least one blade;
   at least one cutting element secured in the at least one cutter pocket, the cutting element comprising a substrate and an ultrahard layer disposed on the substrate; and
   at least two braze materials securing the at least one cutting element in the at least one cutter pocket, wherein a first braze material is adjacent the ultrahard layer and has a braze temperature less than 700° C. and the second braze material has a braze temperature greater than 700° C. and is rearwardly located from the ultrahard layer.

28. The bit of claim 27, wherein the first braze alloy is a silver-based alloy.

29. The bit of claim 27, wherein the second braze alloys is a silver-based alloy.

30. The bit of claim 27, wherein the ultrahard layer comprises polycrystalline diamond.

* * * * *